United States Patent
Asano (10) Patent No.: US 11,953,819 B2
(45) Date of Patent: Apr. 9, 2024

(54) LENS APPARATUS AND IMAGE PICKUP APPARATUS

(71) Applicant: CANON KABUSHIKI KAISHA, Tokyo (JP)

(72) Inventor: Kota Asano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/980,598

(22) Filed: Nov. 4, 2022

(65) Prior Publication Data

US 2023/0053565 A1 Feb. 23, 2023

Related U.S. Application Data

(63) Continuation of application No. 16/823,651, filed on Mar. 19, 2020, now Pat. No. 11,513,422.

(30) Foreign Application Priority Data

Apr. 4, 2019 (JP) .................................. 2019-071998
Jan. 27, 2020 (JP) .................................. 2020-011203

(51) Int. Cl.
*G03B 7/00* (2021.01)
*G03B 9/06* (2021.01)
*G03B 17/14* (2021.01)

(52) U.S. Cl.
CPC ................. *G03B 7/00* (2013.01); *G03B 9/06* (2013.01); *G03B 17/14* (2013.01)

(58) Field of Classification Search
CPC ... G03B 7/00; G03B 7/08; G03B 9/00; G03B 9/06; G03B 17/14
See application file for complete search history.

(56) References Cited

U.S. PATENT DOCUMENTS

| | | | |
|---|---|---|---|
| 5,953,062 A | 9/1999 | Sugimori | |
| 8,675,123 B2 | 3/2014 | Saito | |
| 9,154,066 B2 | 10/2015 | Yoshimuta | |
| 9,459,429 B2 | 10/2016 | Asano | |
| 11,513,422 B2 * | 11/2022 | Asano | ....... G03B 9/06 |
| 2002/0057910 A1 | 5/2002 | Murakami | |

(Continued)

FOREIGN PATENT DOCUMENTS

JP 6053429 B2 12/2016

OTHER PUBLICATIONS

Office Action issued in U.S. Appl. No. 16/823,651 dated Apr. 29, 2021.

(Continued)

*Primary Examiner* — Christopher E Mahoney
(74) *Attorney, Agent, or Firm* — ROSSI, KIMMS & McDOWELL LLP (57) ABSTRACT

A lens apparatus includes an aperture stop, a driving device configured to drive the aperture stop, a storage storing a driving instruction value for driving the aperture stop, and a controller configured to perform control of the driving device based on the driving instruction value. The storage stores the driving instruction value, among a plurality of ones of the driving instruction value, by which an absolute value of a difference, between a target aperture value and an actual aperture value obtained by the control, that is largest with respect to a plurality of ones of the drive amount is minimized.

14 Claims, 6 Drawing Sheets

(56) References Cited

U.S. PATENT DOCUMENTS

2007/0065135 A1  3/2007  Takei
2010/0329659 A1  12/2010  Yamada

OTHER PUBLICATIONS

Notice of Allowance issued in U.S. Appl. No. 16/823,651 dated Oct. 26, 2021.
Office Action issued in U.S. Appl. No. 16/823,651 dated Mar. 9, 2022.
Notice of Allowance issued in U.S. Appl. No. 16/823,651 dated Aug. 9, 2022.

* cited by examiner

LENS APPARATUS AND IMAGE PICKUP APPARATUS

BACKGROUND OF THE INVENTION

Field of the Invention

The present invention relates to a lens apparatus and an image pickup apparatus.

Description of the Related Art

Japanese Patent No. 6053429 discloses an image pickup apparatus having an aperture stop (an aperture stop blade or an aperture stop unit) driven in an opening direction or an aperture narrowing direction by an aperture stop driving device having an actuator. The image pickup apparatus disclosed in Japanese Patent No. 6053429 measures an effective aperture value for each step and calculates a driving amount of the aperture stop blade at a predetermined effective aperture value.

In driving the aperture stop by micro-step driving, the driving accuracy of the aperture stop scatters depending on the driving speed. In other words, when the actuator (stepping motor) for driving the aperture stop is accelerated or decelerated by the micro-step driving, the stepping motor (machine) repeats slow or fast movements relative to the driving instruction value (electricity) in accordance with the driving speed. As a result, when the aperture stop is driven by the acceleration or deceleration driving, the driving accuracy of the aperture stop scatters for each drive amount.

However, Japanese Patent No. 6053429 is silent about scattering of driving accuracy during the acceleration or deceleration driving in the micro-step driving. Hence, the image pickup apparatus disclosed in Japanese Patent No. 6053429 has difficulties in controlling the aperture stop at a high speed and with high accuracy.

SUMMARY OF THE INVENTION

An aspect of embodiments provides, for example, a lens apparatus beneficial in high speed and high precision of an aperture stop control.

A lens apparatus according to one aspect of the present invention includes an aperture stop, a driving device configured to drive the aperture stop, a storage storing a driving instruction value for driving the aperture stop, and a controller configured to perform control of the driving device based on the driving instruction value. The storage stores the driving instruction value, among a plurality of ones of the driving instruction value, by which an absolute value of a difference, between a target aperture value and an actual aperture value obtained by the control, that is largest with respect to a plurality of ones of the drive amount is minimized.

An image pickup apparatus according to another aspect of the present invention includes the above lens apparatus, and an image pickup element configured to pick up an image formed via the lens apparatus.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 2:
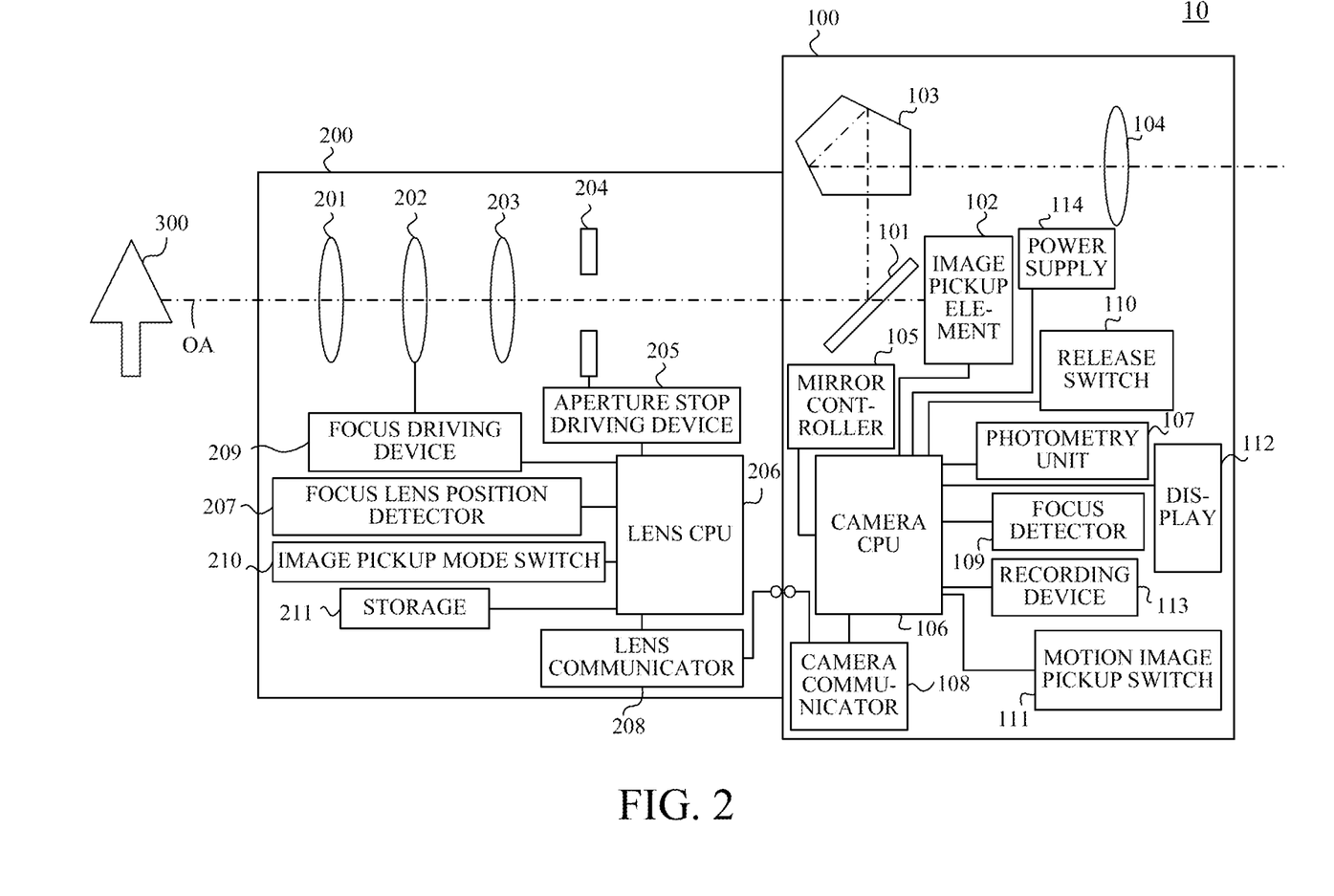
FIG. 2 is a block diagram illustrating a configuration of an image pickup apparatus according to each embodiment.

Referring now to FIG. 2, a description will be given of an overview of an image pickup apparatus (camera system) according to this embodiment. FIG. 2 is a block diagram illustrating a configuration of an lens interchangeable type single-lens reflex camera as an image pickup apparatus 10 according to this embodiment.

As illustrated in FIG. 2, the image pickup apparatus 10 includes a camera body 100 that holds an image pickup element (image sensor or image pickup unit) 102, and an interchangeable lens (lens apparatus) 200 that is attachable to and detachable from the camera body 100. In this embodiment, the image pickup apparatus 10 as an optical apparatus includes the interchangeable lens 200 and the camera body 100, but an interchangeable lens unit (lens apparatus) alone having an aperture stop mechanism (aperture stop or aperture stop unit) 204 may be treated as an optical apparatus. While this embodiment describes a lens interchangeable type single-lens reflex camera as the image pickup apparatus 10, the present invention is also applicable to a lens-integrated type camera in which a camera body and a lens apparatus are integrated with each other.

In the interchangeable lens 200, reference numeral 201 is a first lens unit, reference numeral 202 is a focus lens unit, reference numeral 203 is a magnification varying lens unit, and reference numeral 204 is an aperture stop mechanism (aperture stop). The first lens unit 201, the focus lens unit 202, the magnification varying lens unit 203, and the aperture stop mechanism 204 constitute an image pickup optical system.

The aperture stop mechanism 204 includes a plurality of unillustrated aperture stop blades, an unillustrated opening/closing mechanism for opening and closing the plurality of aperture stop blades, and an aperture stop driving device 205 as a driving device (driving unit) for driving the opening/closing mechanism. The aperture stop mechanism 204 is a so-called iris aperture stop in which some of the plurality of aperture stop blades arranged around the optical axis OA fold to form an aperture on the optical axis OA. The aperture value (F-number) increases or decreases according to the positions of the plurality of aperture stop blades, the folding amount of the plurality of aperture stop blades changes according to the positions of the plurality of aperture stop blades, and the working load applied to the aperture stop driving device 205 also changes. In general, the working load is large on the side where the aperture value is large or the folding amount of the plurality of aperture stop blades increases. The aperture stop driving device 205 has a stepping motor, and its driving is controlled by a lens CPU 206 as a controller (control unit) described later. The aperture stop mechanism 204 can be driven in a first driving direction from a maximum aperture side to a minimum aperture side and in a second driving direction from the minimum aperture side to the maximum aperture side.

Reference numeral 207 denotes a focus lens position detector (position detecting unit) for detecting the position of the focus lens unit 202. The lens CPU 206 transmits and receives various information via a camera CPU 106 and a lens communicator (communication unit) 208 and a camera communicator (communication unit) 108, and controls the entire operation of the interchangeable lens 200 together with the camera CPU 106. A focus driving device 209 includes a stepping motor, a vibration motor, or the like, and moves the focus lens unit 202 in a direction along the optical axis OA (optical axis direction) via an unillustrated focus driving mechanism.

The lens CPU 206 controls driving of the focus driving device 209. More specifically, the lens CPU 206 controls the driving direction of the focus driving device 209 by changing the polarity of the focus drive signal applied to the focus driving device 209, and controls the driving instruction value for the focus driving device 209 by increasing or decreasing the number of pulses in the focus driving signal. Thereby, it can control the moving amount of the focus lens unit 202 in the optical axis direction. At this time, the lens CPU 206 refers to focus position information from the focus lens position detector 207. The lens CPU 206 controls driving (rotation direction and driving instruction value) of the aperture stop driving device 205. More specifically, the driving direction of the aperture stop driving device 205 is controlled by changing the polarity of the aperture driving signal applied to the aperture stop driving device 205, and the driving instruction value of the aperture stop driving device 205 is controlled by increasing or decreasing the number of pulses in the aperture stop driving signal. Thereby, the opening/closing operation amounts of the plurality of aperture stop blades in the aperture stop mechanism 204 are controlled.

Reference numeral 210 denotes an image pickup mode switch (mode switching unit) operated by the user to switch between the still image pickup mode and the motion image pickup mode. In this embodiment, the interchangeable lens 200 has the image pickup mode switch 210, but the camera body 100 may has it. Reference numeral 211 denotes a storage (memory such as ROM, or storage unit). The storage 211 stores a driving instruction value of the focus lens unit 202. The storage 211 stores data of a target aperture value and an actual aperture value in a driving instruction value according to the driving direction of the aperture stop mechanism 204, and information of a driving frequency according to a driving instruction amount (also referred to as a driving amount). The driving direction of the aperture stop mechanism 204 may be the first driving direction from the maximum aperture side to the minimum aperture side and the second driving direction from the minimum aperture side to the maximum aperture side. The driving instruction value is a first driving instruction value used for driving in the first driving direction and a second driving instruction value used for driving in the second driving direction. The driving instruction amount is a difference value between a driving instruction value corresponding to the current aperture value of the aperture stop mechanism 204 and a new driving instruction value output to the aperture stop driving device 205. The maximum value of the driving instruction amount is a driving amount that allows the aperture stop mechanism 204 to drive from the maximum aperture side to the minimum aperture side.

When driving the aperture stop mechanism 204 in the first driving direction, the lens CPU 206 outputs a driving instruction based on the target aperture value, the current aperture value, and the first driving instruction value to the aperture stop driving device 205, and controls the aperture stop driving device 205. When driving the aperture stop mechanism 204 in the second driving direction, the lens CPU 206 outputs a driving instruction based on the target aperture value, the current aperture value, and the second driving instruction value to the aperture stop driving device 205, and controls the aperture stop driving device 205. The lens CPU 206 obtains a correction value QN from the relationship between the target aperture value and the actual aperture value in the aperture stop mechanism 204. A method for controlling the aperture stop mechanism 204 using the correction value QN will be described later.

Each data stored in the storage 211 can be read out by the lens CPU 206 at any time. Light from an object 300 (object light) passes through the image pickup optical system in the interchangeable lens 200 and enters the camera body 100. In the camera body 100, an object image is formed on the image pickup element 102 by the object light while a quick return mirror 101 retracts from the optical path. The image pickup element 102 includes a photoelectric conversion element, such as a CCD sensor and a CMOS sensor, and photoelectrically converts an object image (optical image) formed via an image pickup optical system. When the quick return mirror 101 is disposed in the optical path, the object light is reflected by the quick return mirror 101 and guided to a pentaprism 103. The object light reflected by the pentaprism 103 passes through a finder optical system 104 and is guided to the user's eye. Thereby, the user can visually recognize the object image.

The mirror controller 105 controls the up/down operation of the quick return mirror 101 based on a control signal from the camera CPU 106. A photometry unit 107 calculates the object brightness from the output signal of the image pickup element 102 or a video signal generated by an unillustrated image processing circuit described below, and outputs this to the camera CPU 106 as photometry information. A focus detector 109 detects a focus state of the image pickup optical system by a phase difference detection method using the object light reflected by an unillustrated sub-mirror provided behind the quick return mirror 101 in the still image pickup mode. Then, the focus detector 109 outputs focus information indicating the focus state to the camera CPU 106. The camera CPU 106 controls the position of the focus lens unit 202 via the focus driving device 209 based on the focus information, and obtains an in-focus state.

In the motion image pickup mode, the camera CPU 106 generates contrast information indicating a contrast state of a video from a video signal generated by an image processing circuit described later. Then, the camera CPU 106 controls the position of the focus lens unit 202 based on the contrast information to obtain the in-focus state. The camera CPU 106 calculates an aperture value to be set in the aperture stop mechanism 204 and an operation speed of an unillustrated shutter for controlling the exposure amount of the image pickup element 102 in the still image pickup mode based on the photometry state.

A release switch 110 outputs a SW1 signal in response to a half-pressing operation (SW1 ON) by the user, and outputs a SW2 signal in response to a fully pressing operation (SW2 ON). The camera CPU 106 starts a still image pickup preparation operation, such as the photometry and the focus detection, in response to the input of the SW1 signal, and starts an image pickup operation of a still image for recording in response to the input of the SW2 signal. Whenever the user operates the motion image pickup switch 111, the motion image pickup switch 111 starts a recording motion image pickup operation in response to a motion image pickup start signal, and stops the pickup operation in response to a motion image pickup stop signal. In this embodiment, the motion image pickup switch 111 is provided separately from the release switch 110, but the release switch 110 may also serve as the motion image pickup switch.

An image processing circuit performs the amplification and various image processing for the image pickup signal output from the image pickup means 102 to generate a digital video signal. The camera CPU 106 generates a still image for recording, a motion image for displaying, and a motion image for recording using the digital video signal. The display motion image is displayed as an electronic viewfinder image on a display 112 including a display device such as an LCD panel. The recording device 113 records the still image for recording and the motion image for recording on a recording medium such as a semiconductor memory. Reference numeral 114 denotes a power supply for the camera body 100.

Figure 1A:
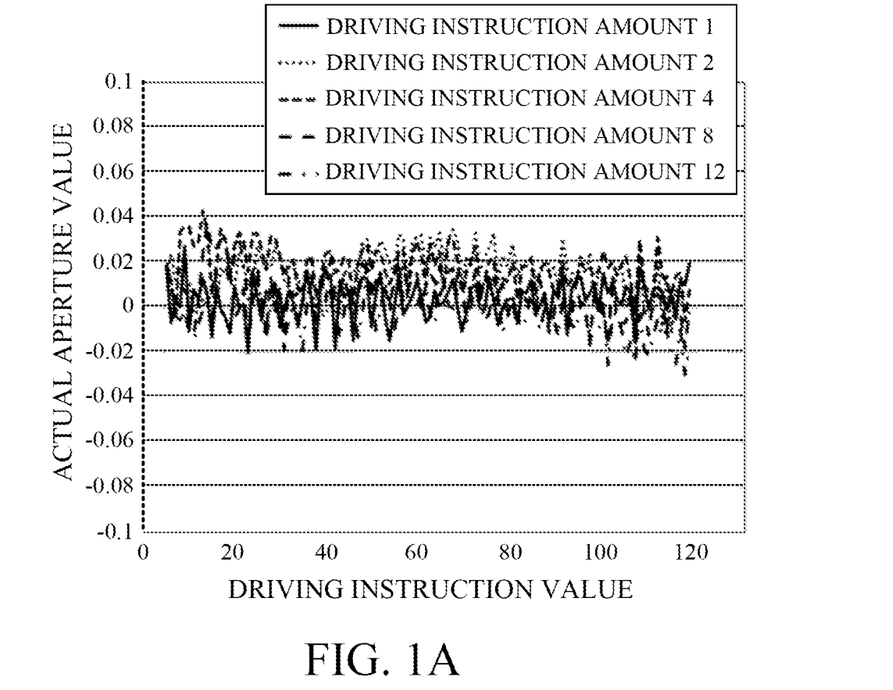
FIGS. 1A and 1B are graphs illustrating actual aperture values before and after corrections according to a first embodiment.
Figure 1B:
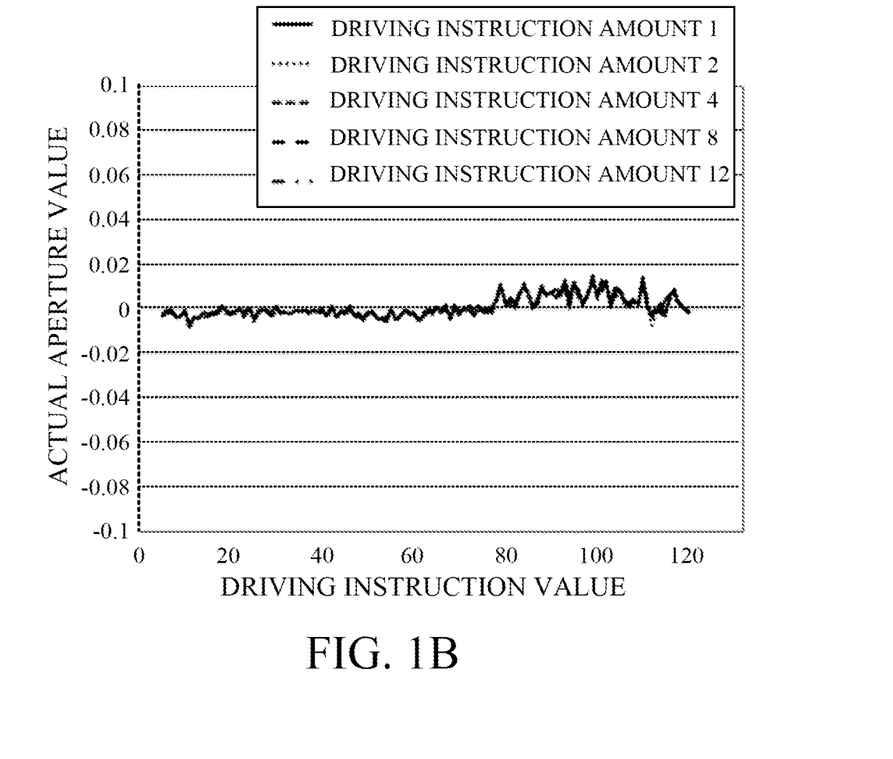

Next follows a description of a method of obtaining the correction value $Q_{N1}$ from the relationship between the target aperture value and the actual aperture value in the driving instruction value according to the driving direction of the aperture stop mechanism 204 of this embodiment, and of controlling the aperture stop mechanism 204 using the correction value $Q_{N1}$. The storage 211 stores the target aperture value corresponding to the driving instruction value for each driving direction of the aperture stop mechanism 204, which is given from the lens CPU 206 to the aperture stop driving device 205. This embodiment will describe an example of one-way driving from the maximum aperture side to the minimum aperture side (an example of one-way driving in the first driving direction: FIGS. 1A and 1B).

Figure 3:
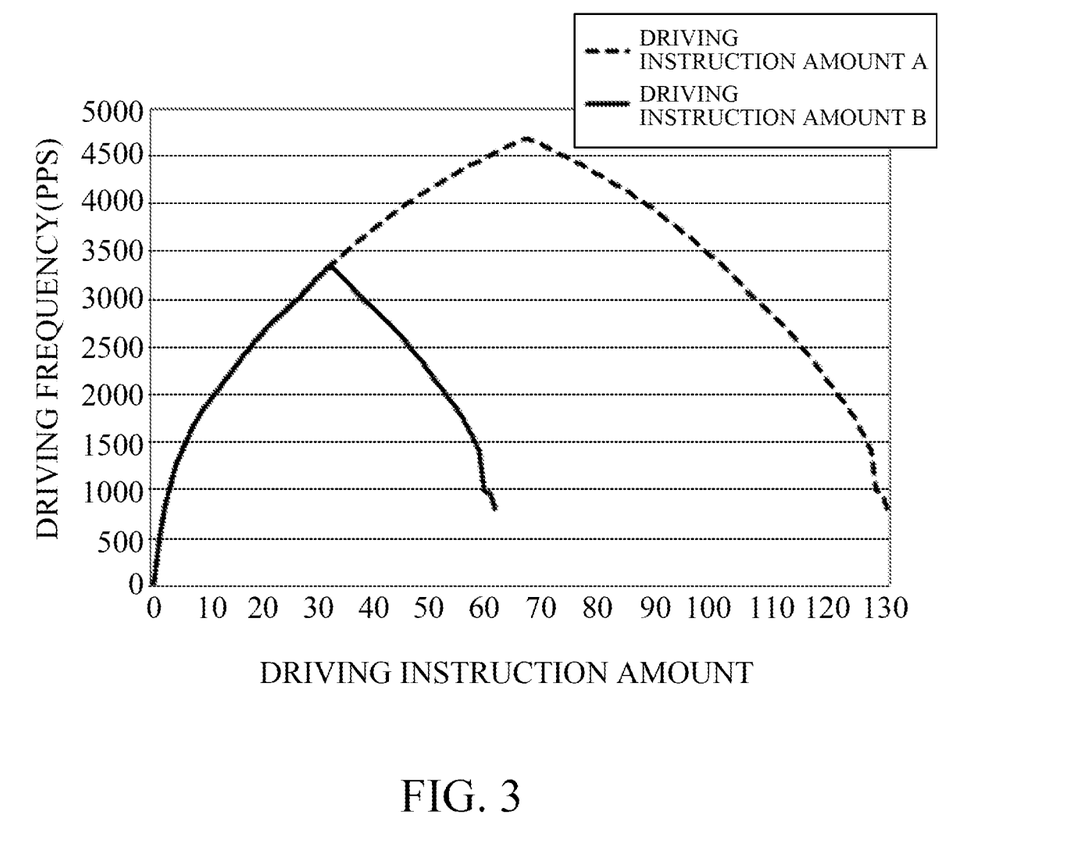
FIG. 3 is a graph illustrating a driving instruction amount and a driving frequency according to each embodiment.

FIG. 3 is a graph showing an example of a driving frequency corresponding to each driving instruction amount when the aperture stop mechanism 204 is driven by the acceleration driving and deceleration driving. The abscissa axis in FIG. 3 indicates the driving instruction amount (the number of steps), and the ordinate axis indicates the driving frequency (pps). The storage 211 stores information on the driving frequency corresponding to each driving instruction amount of the aperture stop mechanism 204. As indicated by driving instruction amounts A and B in the graph of FIG. 3, the driving frequency used to drive the aperture stop mechanism 204 differs depending on the driving instruction amount. As described above, the driving frequency used to drive the aperture stop mechanism 204 differs between the driving instruction amounts A and B different from each other. Therefore, if the aperture stop mechanism 204 is driven with the driving instruction amounts A and B, the aperture stop accuracy (actual aperture value) scatters.

Accordingly, in this embodiment, the lens CPU 206 measures the actual aperture value $Fno_{CLOSE}$ according to the driving instruction value of the aperture stop mechanism 204 in the driving direction (first driving direction) from the maximum aperture side to the minimum aperture side for each driving instruction amount, and stores it in the storage 211. Next, the lens CPU 206 measures the actual aperture value $Fno_{OPEN}$ according to the driving instruction value of the aperture stop mechanism 204 in the driving direction (second driving direction) from the minimum aperture side to the maximum aperture side for each driving instruction amount, and stores it in the storage 211. The lens CPU 206 compares the actual aperture values $Fno_{CLOSE}$ and $Fno_{OPEN}$ for each driving instruction amount for the driving instruction value of the aperture stop mechanism 204 for each driving direction, with the target aperture value corresponding to the driving instruction value for each driving direction already stored in the storage 211. Then, the lens CPU 206 extracts a driving instruction value that minimizes the absolute value of the difference between both the aperture values, and stores it as a new driving instruction value (correction value $Q_{N1}$) in the storage 211.

The lens CPU 206 may extract the driving instruction value in which the absolute value of the difference between both the aperture values falls within a permissible range of the aperture accuracy or equal to or smaller than a predetermined threshold, and may store it as a new driving instruction value (correction value QN1) in the storage 211. Next follows a description of an example in which the lens CPU 206 extracts a driving instruction value that minimizes the absolute value of the difference between both the aperture values, and stores it as a new driving instruction value in the storage 211.

Figure 4:
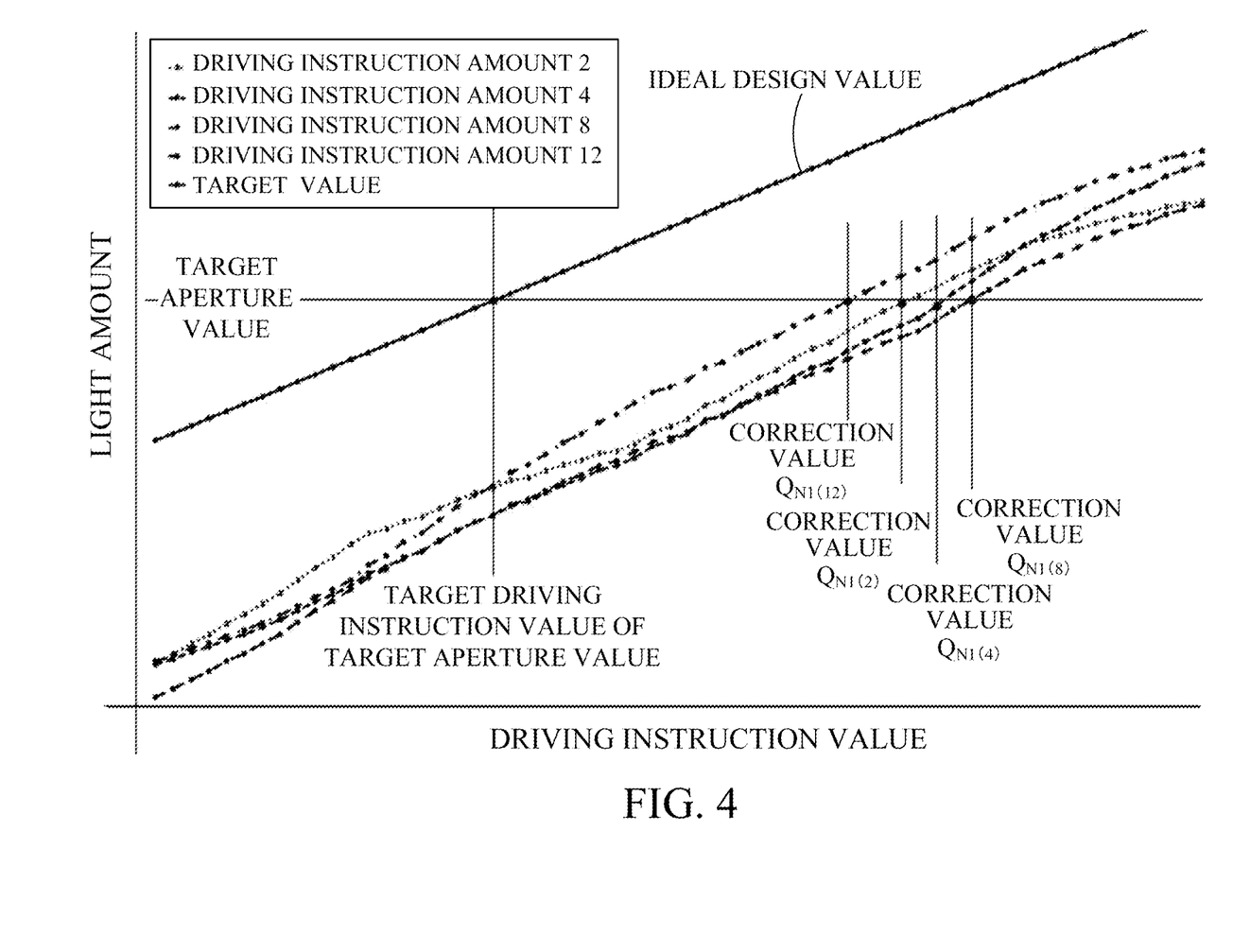
FIG. 4 is a graph illustrating a method for setting a correction value according to the first embodiment.

Referring now to FIG. 4, a description will be given of a method of extracting a driving instruction value that is a source of the correction value $Q_{N1}$. FIG. 4 is a graph showing a method for setting the correction value $Q_{N1}$ according to this embodiment. In FIG. 4, the abscissa axis indicates the driving instruction value, and the ordinate axis indicates the light amount. The light amount may be either the light amount that passes through the aperture formed by the aperture stop blades when the aperture stop mechanism 204 is driven, or the light amount that passes through the interchangeable lens 200 including the image pickup optical system. FIG. 4 illustrates the light amount passing through the interchangeable lens 200 including the image pickup optical system.

In FIG. 4, a solid line plots the relationship between the light amount corresponding to each target aperture value and the corresponding driving instruction value. The other line indicates the light amount (corresponding to the actual aperture value) passing through the interchangeable lens 200 including the image pickup optical system in each of the driving instruction amounts 2, 4, 8, and 12 when the aperture stop mechanism 204 is driven to the driving instruction value. Herein, this figure illustrates a target driving instruction value of a light amount corresponding to the target aperture value and a light amount when the aperture stop mechanism 204 is actually driven by each driving instruction amount. For the above reasons, in the comparison at the same light amount corresponding to the same target aperture value, the target driving instruction value and each driving instruction value driven by each driving instruction amount do not coincide with each other, causing scattering. In the example illustrated in FIG. 4, the light amount tends to be dark in each driving instruction value driven by any of the driving instruction amounts for the target aperture value. Therefore, the correction value $Q_{N1}$ is necessary to drive the aperture stop mechanism 204 so as to obtain the light amount corresponding to the target aperture value.

This embodiment compares the actual aperture value $Fno_{CLOSE}$ according to the driving instruction value with the target aperture value for each driving instruction amount, and extracts the driving instruction value that minimizes the absolute value of the difference between the two aperture values of the actual aperture value and the target aperture value. For example, for the target aperture value illustrated in FIG. 4, the correction value is $Q_{N1(2)}$ when the aperture stop mechanism 204 is driven to each driving instruction value with a driving instruction amount 2. The driving instruction value is extracted for all target aperture values for each driving instruction amount, thereby completing the extraction of the correction value $Q_{N1(2)}$. This extraction is also performed for the driving instruction amounts 4, 8, and 12 and all remaining driving instruction amounts corresponding to the driving amount of the aperture stop mechanism 204, and the correction value $Q_{N1}$ is stored in the storage 211. Thereafter, the aperture stop mechanism 204 is operated with the new driving instruction value $Q_{N1}$.

The lens CPU 206 compares the target aperture value with the actual aperture value. When the target aperture value is located in the first driving direction with respect to the actual aperture value, a first driving instruction value of the actual aperture value which minimizes the absolute value of the difference between the target aperture value and the actual aperture value $Fno_{CLOSE}$ is obtained for each driving instruction amount, and set to the first driving instruction value of the target aperture value. On the other hand, when the target aperture value is located in the second driving direction with respect to the actual aperture value, a second driving instruction value of the actual aperture value which minimizes the absolute value of the difference between the target aperture value and the actual aperture value $Fno_{OPEN}$ is obtained for each driving instruction amount, and set to the second driving instruction value of the target aperture value. Then, a driving instruction value that minimizes the absolute value of the difference between both the aperture values is extracted and stored as a new driving instruction value $Q_{N1}$ in the storage 211.

Referring now to FIGS. 1A and 1B, a description will be given of the actual aperture value before the correction value $Q_{N1}$ is applied to the aperture stop mechanism 204 and the actual aperture value after the correction value $Q_{N1}$ is applied to the aperture stop mechanism 204 according to this embodiment. FIG. 1A illustrates and 1B are graphs showing actual aperture values before and after correction (before and after the correction value $Q_{N1}$ is applied) according to this embodiment. FIG. 1A shows the pre-correction graph (before the correction value $Q_{N1}$ is applied), and FIG. 1B shows the post-correction graph (after the correction value $Q_{N1}$ is applied). In FIGS. 1A and 1B, the abscissa axis indicates the driving instruction value, and the ordinate axis indicates the actual aperture value. The actual aperture value indicates that as the error in the + direction in the graph in FIGS. 1A and 1B increases, the aperture value decreases (the light amount passing through the aperture increases). The actual aperture value indicates that the larger the error in the negative direction becomes, the larger the aperture value becomes (the smaller the light amount becomes which passes through the aperture in the aperture stop).

The abscissa axis in FIG. 1A represents the driving instruction value in the first driving direction from the maximum aperture side to the minimum aperture side, and the zero line on the ordinate axis indicates the target aperture value. In the example of FIGS. 1A and 1B, the driving instruction amount is changed to 1, 2, 4, 8, and 12 for the driving instruction value. In the graph of the actual aperture value before the correction value $Q_{N1}$ according to this embodiment is applied (FIG. 1A), the actual aperture value scatters for the target aperture value depending on the driving instruction amount. FIG. 1B is a graph of the actual aperture value obtained by driving the aperture stop mechanism 204 using the correction value $Q_{N1}$ according to this embodiment, and shows a highly accurate aperture stop mechanism close to the target aperture value. In this example, the aperture stop accuracy is already high before the correction value $Q_{N1}$ is applied, but the applied correction value $Q_{N1}$ according to this embodiment can further improve the aperture stop accuracy. Although this embodiment omits the description, since the correction value $Q_{N1}$ is obtained according to the driving direction, the correction value $Q_{N1}$ can be similarly applied to the second driving direction from the minimum aperture side to the maximum aperture side.

The storage 211 stores information on at least one of an orientation (orientation difference) of the interchangeable lens 200 (the image pickup apparatus 10), a driving frequency, and a temperature in a relationship between a driving instruction value of the aperture stop mechanism 204 according to a driving direction of the aperture stop mechanism 204 and an actual aperture stop value. The lens CPU 206 can read such information at any time. The aperture stop driving device 205 controls driving of the aperture stop mechanism 204 based on the information on at least one of the orientation (orientation difference), the driving frequency, and the temperature in the relationship between the driving instruction value of the aperture stop mechanism 204 according to the driving direction of the aperture stop mechanism 204 stored in the storage 211 and the actual aperture value. Thereby, the correction value $Q_{N1}$ is applicable even under the orientation difference, various driving frequencies, and temperature environments.

Thus, in this embodiment, the lens apparatus (interchangeable lens 200) includes the aperture stop (aperture stop mechanism 204), the driving device (aperture stop driving device 205), the storage 211, and the controller (the lens CPU 206). The driving device drives the aperture stop. The storage 211 stores a driving instruction value (correction value $Q_{N1}$) for driving the aperture stop from the current aperture value to the target aperture value. The controller controls the driving device based on the driving instruction value. The driving instruction value is a driving instruction value (such as the correction values $Q_{N1(2)}$, $Q_{N1(4)}$, $Q_{N1(8)}$, $Q_{N1(12)}$) that minimizes an absolute value of a difference between a target aperture value and an actual aperture value among a plurality of driving instruction values set for each of the driving instruction amounts (such as the driving instruction amounts 2, 3, 8, and 12 in FIG. 4). The plurality of driving instruction values correspond to a plurality of plots on the graph of the respective driving instruction amounts illustrated in FIG. 4. The driving instruction value may be set by comparing the target aperture value and the actual aperture value with each other for a plurality of driving instruction values for each driving instruction amount (by comparing the plurality of plots on the graph of the target aperture value and each driving instruction amount with each other).

As described above, this embodiment can improve the aperture stop accuracy while maintaining a high speed even when the aperture stop is driven by the acceleration or deceleration driving through the micro-step driving.

Second Embodiment

Next follows a description of a second embodiment according to the present invention. The basic configuration of the image pickup apparatus according to this embodiment is the same as that of the image pickup apparatus 10 described with reference to FIG. 2 in the first embodiment, and a description thereof will be omitted.

Figure 6:
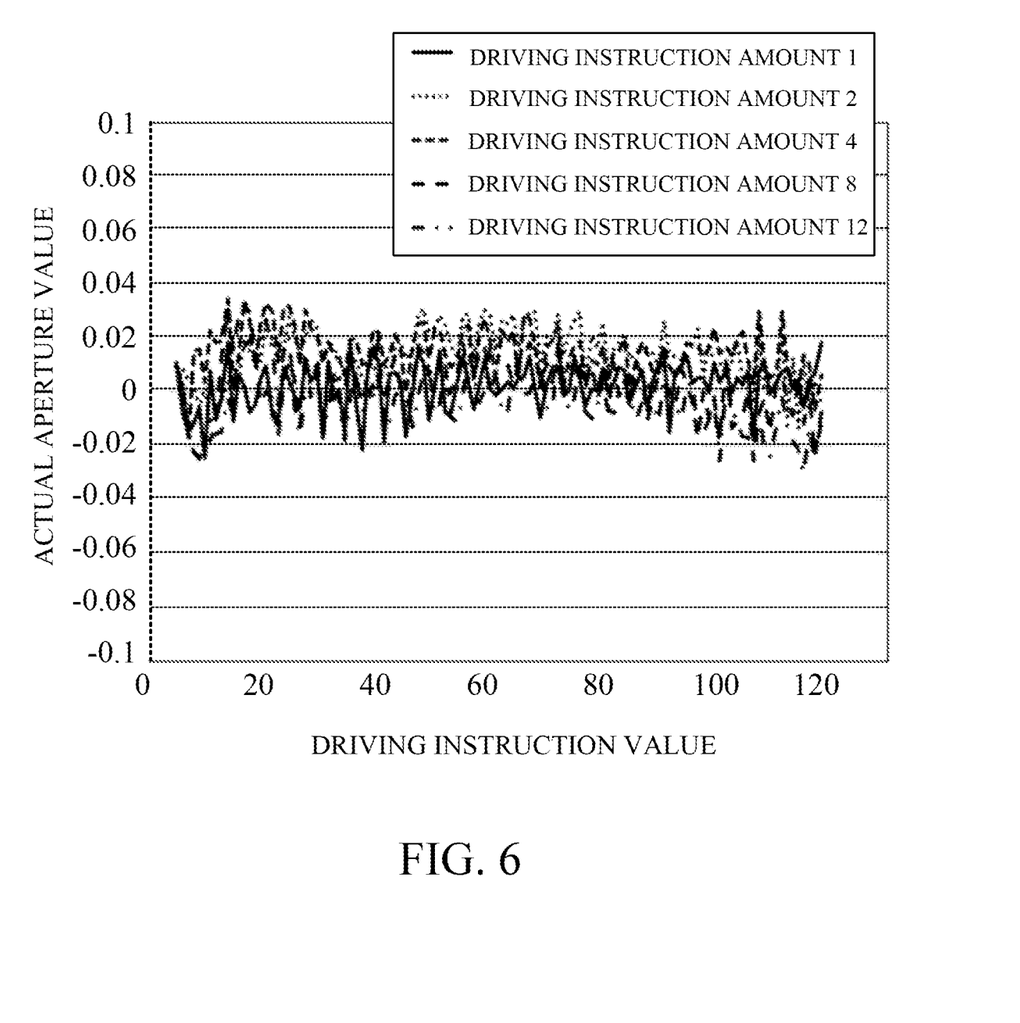
FIG. 6 is a graph illustrating the actual aperture value after correction according to the second embodiment.

In this embodiment, the lens CPU 206 obtains the correction value $Q_{N2}$ from the relationship between the target aperture value and the actual aperture value in the driving instruction value according to the driving direction of the aperture stop mechanism 204, and controls the aperture stop mechanism 204 using the correction value $Q_{N2}$. The storage 211 stores a target aperture value corresponding to a driving instruction value for each driving direction given from the lens CPU 206 to the aperture stop driving device 205 in the aperture stop mechanism 204. This embodiment will describe an example of one-way driving from the maximum aperture side to the minimum aperture side (one-way driving example in the first driving direction: FIG. 6).

As illustrated in FIG. 3, the driving frequency used for driving the aperture stop mechanism 204 differs between the driving instruction amounts A and B different from each other. Therefore, if the aperture stop mechanism 204 is driven with the driving instruction amounts A and B, the aperture stop accuracy (actual aperture value) scatters.

Therefore, in this embodiment, the lens CPU 206 measures the actual aperture value $Fno_{CLOSE}$ according to the driving instruction value of the aperture stop mechanism 204 in the driving direction (first driving direction) from the maximum aperture side to the minimum aperture side for each driving instruction amount, and stores it in the storage 211. Next, the lens CPU 206 measures the actual aperture value $Fno_{OPEN}$ according to the driving instruction value of the aperture stop mechanism 204 in the driving direction (second driving direction) from the minimum aperture side to the maximum aperture side for each driving instruction amount, and stores it in the storage 211. The lens CPU 206 compares the actual aperture values $Fno_{CLOSE}$ and $Fno_{OPEN}$ for the driving instruction value of the aperture stop mechanism 204 for each of the driving directions, with the target aperture value corresponding to the driving instruction value of the aperture stop mechanism 204 already stored for each driving direction in the storage 211. Then, the lens CPU 206 extracts the driving instruction amount that maximizes the absolute value of the difference between the two aperture values of the actual aperture value and the target aperture value. Then, the lens CPU 206 obtains the minimum driving instruction value from among the absolute value of the difference between the actual aperture value and the target aperture value in the extracted driving instruction amount, sets it as a new driving instruction value (correction value $Q_{N2}$), and stores it in the storage 211.

Herein, the lens CPU 206 can find a driving instruction value within a permissible range of the aperture stop accuracy or equal to or smaller than a predetermined threshold from among the absolute values of the difference between the actual aperture value and the target aperture value in the extracted driving instruction amounts. The lens CPU 206 may store the driving instruction value thus obtained as a new driving instruction value (correction value $Q_{N2}$) in the storage 211. As will be described later, the lens CPU 206 obtains the minimum driving instruction value from the absolute value of the difference between the actual aperture value and the target aperture value in the extracted driving instruction amount, and stores it as a new driving instruction value in the storage 211. Thereafter, the lens CPU 206 operates the aperture stop mechanism 204 with the new driving instruction value $Q_{N2}$.

The lens CPU 206 compares the target aperture value with the actual aperture value. If the target aperture value is located in the first driving direction with respect to the actual aperture value, the lens CPU 206 extracts a driving instruction amount which maximizes the absolute difference between the target aperture value and the actual aperture value $Fno_{CLOSE}$. Then, the lens CPU 206 obtains the first driving instruction value of the actual aperture value that minimizes the absolute value of the difference between the actual aperture value and the target aperture value in the extracted driving instruction amounts, and sets it to the first driving instruction value of the target aperture value. The lens CPU 206 similarly make a calculation in the case where the target aperture value is located in the second driving direction with respect to the actual aperture value, and sets it to the second driving instruction value of the target aperture value.

Figure 5:
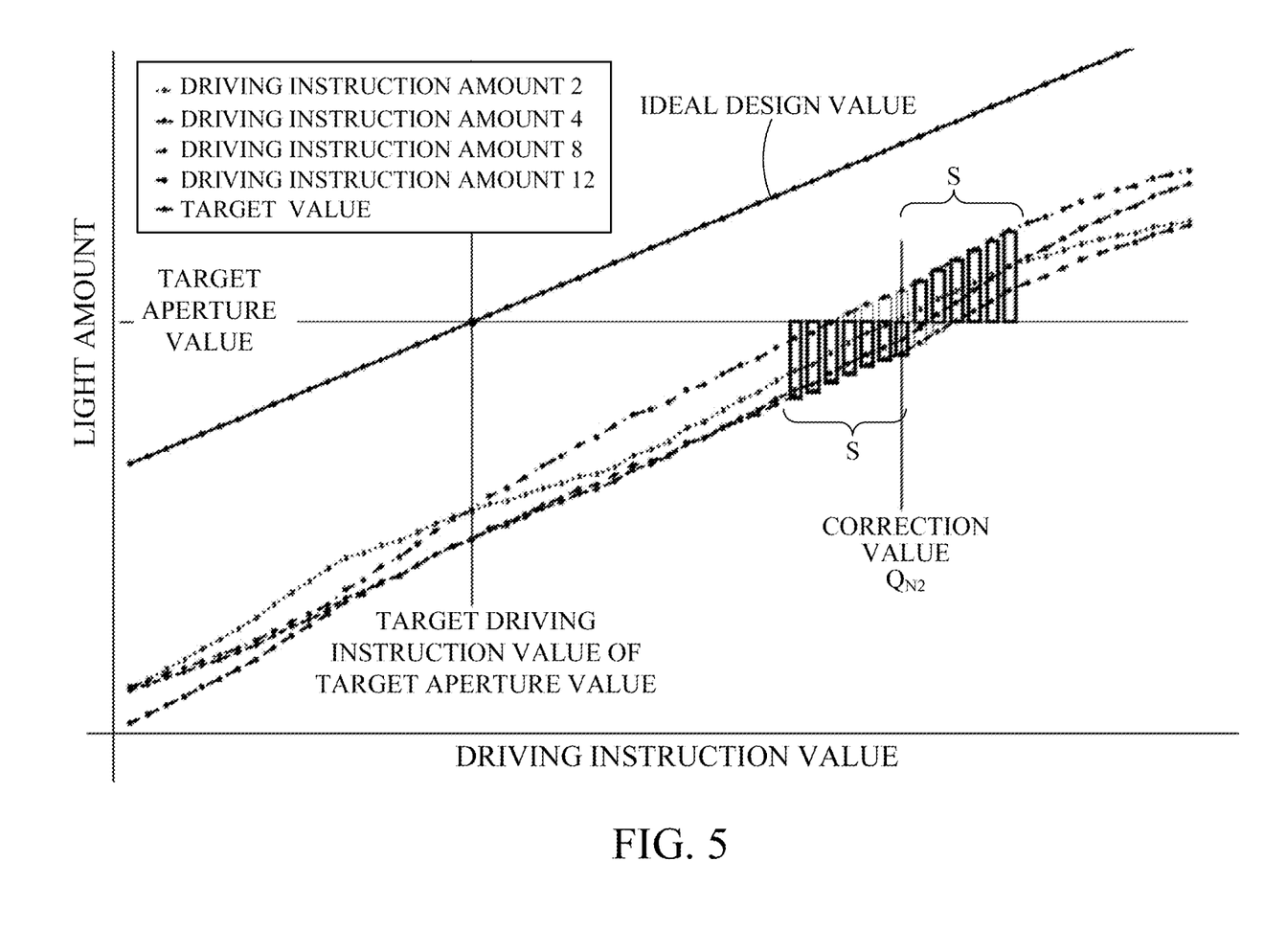
FIG. 5 is a graph illustrating a method for setting a correction value according to a second embodiment.

Referring now to FIG. 5, a description will be given of a method of extracting the driving instruction value that is a source of the correction value $Q_{N2}$. FIG. 5 is a graph showing a method for setting the correction value $Q_{N2}$ according to this embodiment. In FIG. 5, the abscissa axis indicates the driving instruction value, and the ordinate axis indicates the light amount. The light amount may be either the light amount that passes through the aperture formed by the aperture stop blades when the aperture stop mechanism 204 is driven, or the light amount that passes through the interchangeable lens 200 including the image pickup optical system. FIG. 5 illustrates the light amount passing through the interchangeable lens 200 including the image pickup optical system.

In FIG. 5, a solid line plots the relationship between the light amount corresponding to each target aperture value and the corresponding driving instruction value. The other line indicates the light amount (corresponding to the actual aperture value) passing through the interchangeable lens 200 including the image pickup optical system in each of the driving instruction amounts 2, 4, 8, and 12 when the aperture stop mechanism 204 is driven to the driving instruction value. Herein, this figure illustrates a target driving instruction value of a light amount corresponding to the target aperture value and a light amount when the aperture stop mechanism 204 is actually driven by each driving instruction amount. For the above reasons, in the comparison at the same light amount corresponding to the same target aperture value, the target driving instruction value and each driving instruction value driven by each driving instruction amount do not coincide with each other, causing scattering. In the example illustrated in FIG. 5, the light amount tends to be dark in each driving instruction value driven by any of the driving instruction amounts for the target aperture value. Therefore, the correction value $Q_{N1}$ is necessary to drive the aperture stop mechanism 204 so as to obtain the light amount corresponding to the target aperture stop value.

This embodiment compares the actual aperture value $Fno_{CLOSE}$ according to the driving instruction value with the target aperture value for each driving instruction amount, and extracts the driving instruction value that maximizes the absolute value of the difference between the two aperture values of the actual aperture value and the target aperture value. Then, this embodiment extracts a driving instruction value of the minimum driving instruction amount from among the absolute values of the difference between the actual aperture value and the target aperture value in the extracted driving instruction amounts. For example, FIG. 5 illustrates, through bold (solid line) square S, the maximum absolute value of the difference between the light amount corresponding to the target aperture value and the light amount at each of the driving instruction values corresponding to the driving instruction amounts 2, 4, 8, and 12. Herein, the comparison with the light amount corresponding to the target aperture value uses thirteen squares S for simple description. The number of squares S to be compared is not limited to thirteen as long as it can be extracted. The maximum absolute value of the difference increases and decreases depending on the driving instruction value, and the corresponding driving instruction amount may differ depending on the driving instruction value.

Next, a correction value $Q_{N2}$ is extracted by a driving instruction value corresponding to the maximum value of the extracted absolute values of the difference, which is minimum. The first embodiment makes this extraction for all of the driving instruction amounts 4, 8, and 12, and the remaining driving instruction amounts according to the driving amount of the aperture stop mechanism 204, whereas this embodiment does not make this extraction and stores the value $Q_{N2}$ in the storage 211.

Thereafter, the aperture stop mechanism 204 is operated with the new driving instruction value $Q_{N2}$. That is, the lens CPU 206 measures the actual aperture value of the aperture stop mechanism 204 using a measuring device (not shown), while reciprocating the aperture stop mechanism 204 based on the driving instruction (driving instruction value). Thereby, the lens CPU 206 acquires the first driving instruction value and the second driving instruction value stored in the storage 211. The lens CPU 206 compares the target aperture value and the actual aperture value with each other. When the target aperture value is located in the first driving direction with respect to the actual aperture value, a driving instruction amount is extracted which maximizes the absolute value of the difference between the target aperture value and the actual aperture value $Fno_{CLOSE}$. Then, the lens CPU 206 obtains the first driving instruction value of the actual aperture value that is the minimum from among the absolute values of the difference between the actual aperture value and the target aperture value in the extracted driving instruction amounts, and sets it to the first driving instruction value of the target aperture value. The lens CPU 206 similarly makes this calculation in the case where the target aperture value is located in the second driving direction of the actual aperture value, and sets it to the second driving instruction value of the target aperture value.

Referring now to FIG. 6, a description will be given of the actual aperture value after the correction value $Q_{N2}$ is applied to the aperture stop mechanism 204 according to this embodiment. FIG. 6 is a graph showing the actual aperture value after correction (after the correction value $Q_{N2}$ is applied) according to this embodiment. In FIG. 6, the ordinate axis indicates the actual aperture value. As illustrated, as the error in the + direction of the graph increases, the aperture value decreases (or the light amount passing through the aperture in the aperture stop increases), and as the error in the − direction increases, the aperture value increases (or the light amount passing through the aperture in the aperture stop decreases). The abscissa axis indicates the driving instruction value in the first driving direction from the maximum aperture side to the minimum aperture side, and the zero line on the ordinate axis indicates the target aperture value. In the example of FIG. 6, the driving instruction amount is changed to 1, 2, 4, 8, and 12 for the driving instruction value. The graph of the actual aperture value before the correction value $Q_{N2}$ according to this embodiment is applied is as illustrated in FIG. 1A.

FIG. 6 is a graph of the actual aperture value obtained by driving the aperture stop mechanism 204 using the correction value $Q_{N2}$ according to this embodiment, and shows the aperture stop mechanism closer to the target aperture value than FIG. 1A. In this embodiment, by applying the correction value $Q_{N2}$, not only the aperture stop mechanism is closer to the target aperture stop value, but also an amount of information stored in the storage 211 can be smaller than the first embodiment.

More specifically, the first embodiment measure the actual aperture value $Fno_{CLOSE}$ corresponding to the driving instruction value in the driving direction (first driving direction) from the maximum aperture side to the minimum aperture side of the aperture stop mechanism 204 for each driving instruction amount, and stores it in the storage 211. The first embodiment obtains the first driving instruction value of the actual aperture value that minimizes the absolute value of the difference between the target aperture value and the actual aperture value $Fno_{CLOSE}$ stored in the storage 211 in advance, for each driving instruction amount. Then, the first embodiment needs to store a plurality of patterns corresponding to the driving amounts from the maximum aperture side to the minimum aperture side of the aperture stop mechanism 204 as the first driving instruction value of each target aperture value.

On the other hand, this embodiment compares the target aperture value and the actual aperture value stored in advance in the storage 211 with each other, but may store only one pattern as the first driving instruction value corresponding to the target aperture value. Therefore, the amount of information stored in the storage 211 can be saved. In this embodiment, the aperture stop accuracy is already high before the correction value $Q_{N2}$ is applied, but the applied correction value $Q_{N2}$ can further improve the aperture stop accuracy. Further, in this embodiment, since the correction value $Q_{N2}$ can be obtained according to the driving direction, the correction value $Q_{N2}$ can be similarly applied in the second driving direction from the minimum aperture side to the maximum aperture side. The storage 211 stores information on at least one of the orientation (orientation difference), the driving frequency, and the like of the interchangeable lens 200 (the image pickup apparatus 10) in the relationship between the driving instruction value of the aperture stop mechanism 204 according to the driving direction of the aperture stop mechanism 204 and the actual aperture stop value. The lens CPU 206 can read this information at any time. The aperture stop driving device 205 controls driving of the aperture stop mechanism 204 based on the information on at least one of the orientation (orientation difference), the driving frequency, and the temperature in the relationship between the driving instruction value of the aperture stop mechanism 204 according to the driving direction of the aperture stop mechanism 204 stored in the storage 211 and the actual aperture value. Thereby, the correction value $Q_{N2}$ is applicable even under the orientation difference, various driving frequencies, and temperature environments.

Thus, in this embodiment, the lens apparatus (interchangeable lens 200) includes the aperture stop (aperture stop mechanism 204), the driving device (aperture stop driving device 205), the storage 211, and the controller (lens CPU 206). The driving device drives the aperture stop. The storage 211 stores a driving instruction value (correction value QN2) for driving the aperture stop from the current aperture value to the target aperture value. The controller controls the driving device based on the driving instruction value. The driving instruction value (correction value $Q_{N2}$) is a driving instruction value that minimizes an absolute value of a difference between a target aperture value and an actual aperture value among a plurality of driving instruction values in the driving instruction amounts which maximizes the absolute value of the difference between the target aperture value and the actual aperture value. Herein, the plurality of driving instruction values in the driving instruction amounts which maximizes the absolute value of the difference between the target aperture value and the actual aperture value corresponds to the driving instruction value for driving the aperture stop mechanism 204 shown by the thirteen solid-line squares S in FIG. 5 to each position. In other words, regarding the seven squares S on the left side in FIG. 5, it is a difference between the actual aperture value and the target aperture value when the aperture stop mechanism 204 is driven by the driving instruction values illustrated in the seven squares S on the left side with the driving instruction amount of 8. In addition, regarding the six squares S on the right side in FIG. 5, it is a difference between the actual aperture value and the target aperture value when the aperture stop mechanism 204 is driven by the driving instruction values illustrated in the six squares S on the right side with the driving instruction amount of 12.

The driving instruction value which minimizes the absolute value of the difference between the target aperture value and the actual aperture value is a driving instruction value of the driving instruction amount corresponding to the square having the minimum length among the thirteen squares S illustrated in FIG. 5. The driving instruction value may be set by comparing the target aperture value and the actual aperture value with each other for a plurality of driving instruction values for each driving instruction amount and by extracting a driving instruction amount that maximizes the absolute value of the difference between the target aperture value and the actual aperture value for each of the plurality of driving instruction values.

As described above, this embodiment can improve the aperture stop accuracy while maintaining a high speed even when the aperture is driven by the acceleration or deceleration driving through the micro-step driving.

In each embodiment, the aperture stop may be driven in the first driving direction from the maximum aperture side to the minimum aperture side and in the second driving direction from the minimum aperture side to the maximum aperture side. The storage stores, as the driving instruction value, a first driving instruction value used to drive the aperture stop in the first driving direction, and a second driving instruction value used to drive the aperture stop in the second driving direction. When the target aperture value is located in the first driving direction with respect to the current aperture value, the controller controls the driving device based on the first driving instruction value. When the target aperture value is located in the second driving direction with respect to the current aperture value, the controller controls the driving device based on the second driving instruction value.

The driving instruction amount may be a difference amount between a driving instruction value corresponding to a current aperture value of the aperture stop and a next driving instruction value output to the driving device. The driving device may drive the aperture stop by the micro-step driving (driving using a sine wave signal and a cosine wave signal) and perform the acceleration driving and deceleration driving. The storage may store data indicating a relationship between the driving instruction value and the actual aperture value. The storage may store data for at least one of information on the orientation, the driving frequency, and the temperature of the lens apparatus. The controller may output to the driving device a driving instruction value based on at least one of the orientation, the driving frequency, and the temperature of the lens apparatus.

Each embodiment uses a stepping motor for the aperture stop driving device 205, but the present invention is not limited to this embodiment. The aperture stop driving device 205 may use, for example, a DC motor, a linear motor, an ultrasonic motor, and the like.

Each embodiment can provide a lens apparatus and an image pickup apparatus, each of which can control an aperture stop at a high speed and with high accuracy through the micro-step driving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-071998, filed on Apr. 4, 2019, and 2020-011203, filed on Jan. 27, 2020, each of which is hereby incorporated by reference herein in its entirety.

What is claimed is:

1. A lens apparatus comprising:
an aperture stop;
a driving device configured to drive the aperture stop;
a storage storing multiple driving instruction values and multiple driving amounts for driving the aperture stop; and
a controller configured to perform control of the driving device based on the driving instruction value,
wherein the multiple driving amounts correspond to one target aperture value of the aperture stop, and
wherein each of the multiple driving amounts corresponds to one of the multiple driving instruction values for the one target aperture value of the aperture stop.

2. The lens apparatus according to claim 1, wherein the storage stores the multiple driving instruction values, with respect to the respective multiple driving amounts of the aperture stop, by which an absolute value of a difference between the one target aperture value and an actual aperture value is not greater than a threshold.

3. The lens apparatus according to claim 1, wherein each of the multiple driving instruction values is obtained by comparing the one target aperture value and an actual aperture value with respect to the respective driving amount.

4. The lens apparatus according to claim 1, wherein the storage stores the multiple driving instruction values by which an absolute value of a difference between the one target aperture value and an actual aperture value is largest with respect to the multiple driving amounts of the aperture stop and is minimized.

5. The lens apparatus according to claim 4, wherein each of the multiple driving instruction values is obtained by comparing the one target aperture value and the actual aperture value with respect to the respective driving amount, and extracting a driving amount at which the absolute value is maximized.

6. The lens apparatus according to claim 1, wherein the storage stores the multiple driving instruction values by which an absolute value of a difference between the one target aperture value and an actual aperture value is largest with respect to the multiple driving amounts of the aperture stop and is not greater than a threshold.

7. The lens apparatus according to claim 1, wherein:
the aperture stop is drivable in a first driving direction from a maximum aperture side to a minimum aperture side and in a second driving direction from the minimum aperture side to the maximum aperture side,
the storage stores, as the multiple driving instruction values, a first driving instruction value used for a first case of driving the aperture stop in the first driving direction, and a second driving instruction value used for a second case of driving the aperture stop in the second driving direction, and the controller is configured to control the driving device based on the first driving instruction value in the first case, and control the driving device based on the second driving instruction value in the second case.

8. The lens apparatus according to claim 1, wherein one of the multiple driving amounts is an amount corresponding to a difference between the driving instruction value corresponding to a current aperture value of the aperture stop and a next driving instruction value from among the multiple driving instructions values.

9. The lens apparatus according to claim 1, wherein the driving device is configured to perform acceleration driving and deceleration driving of the aperture stop by micro-step driving.

10. The lens apparatus according to claim 1, wherein the storage stores data indicating a relationship between the multiple driving instruction values for the one target aperture value and an actual aperture value.

11. The lens apparatus according to claim 10, wherein the storage stores the data with respect to at least one of a posture, a driving frequency, or a temperature of the lens apparatus.

12. The lens apparatus according to claim 11, wherein the controller is configured to obtain one of the multiple driving instruction values based on the at least one of the posture, the driving frequency, or the temperature of the lens apparatus.

13. The lens apparatus according to claim 1, wherein the storage stores the multiple driving instruction values, with respect to the respective multiple driving amounts of the aperture stop, by which an absolute value of a difference between the one target aperture value and an actual aperture value is minimized.

14. An image pickup apparatus comprising:
a lens apparatus; and
an image pickup element configured to pick up an image formed via the lens apparatus,
wherein the lens apparatus comprises:
an aperture stop;
a driving device configured to drive the aperture stop;
a storage storing multiple driving instruction values and multiple driving amounts for driving the aperture stop; and
a controller configured to perform control of the driving device based on the driving instruction value,
wherein the multiple driving amounts correspond to one target aperture value of the aperture stop, and
wherein each of the multiple driving amounts corresponds to one of the multiple driving instruction values for the one target aperture value of the aperture stop.

* * * * *